United States Patent
Jayakumar et al.

(10) Patent No.: US 9,311,138 B2
(45) Date of Patent: Apr. 12, 2016

(54) SYSTEM MANAGEMENT INTERRUPT HANDLING FOR MULTI-CORE PROCESSORS

(71) Applicants: Sarathy Jayakumar, Portland, OR (US); Mohan J. Kumar, Aloha, OR (US); Michael D. Kinney, Olympia, WA (US)

(72) Inventors: Sarathy Jayakumar, Portland, OR (US); Mohan J. Kumar, Aloha, OR (US); Michael D. Kinney, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 248 days.

(21) Appl. No.: 13/799,327

(22) Filed: Mar. 13, 2013

(65) Prior Publication Data

US 2014/0281092 A1    Sep. 18, 2014

(51) Int. Cl.
*G06F 9/48* (2006.01)
*G06F 11/07* (2006.01)

(52) U.S. Cl.
CPC .......... *G06F 9/4812* (2013.01); *G06F 11/0772* (2013.01)

(58) Field of Classification Search
CPC ............................ G06F 11/0772; G06F 9/4812
USPC .................................................. 710/260, 269
See application file for complete search history.

(56) References Cited

U.S. PATENT DOCUMENTS

| | | | |
|---|---|---|---|
| 5,564,060 A * | 10/1996 | Mahalingaiah et al. | 710/51 |
| 2002/0099893 A1 * | 7/2002 | Nguyen et al. | 710/260 |
| 2003/0046464 A1 | 3/2003 | Murty et al. | |
| 2003/0051087 A1 | 3/2003 | Corrigan et al. | |
| 2003/0093510 A1 * | 5/2003 | Cen | 709/223 |
| 2003/0229794 A1 | 12/2003 | Sutton, II et al. | |
| 2004/0153593 A1 | 8/2004 | Watt et al. | |
| 2007/0088890 A1 | 4/2007 | Wieland et al. | |
| 2007/0150632 A1 * | 6/2007 | Ayyar et al. | 710/260 |
| 2008/0091867 A1 * | 4/2008 | Plondke et al. | 710/261 |
| 2009/0144579 A1 * | 6/2009 | Swanson | 714/3 |
| 2009/0172372 A1 | 7/2009 | Kumar et al. | |
| 2009/0172385 A1 | 7/2009 | Datta et al. | |

OTHER PUBLICATIONS

"System Management Mode," Wikipedia, The Free Encyclopedia, retrieved from: <http://en.wikipedia.org/w/index.php?title=System_Management_Mode&oldid=508963120>, edited Aug. 24, 2012, 3 pages.

"Interrupt handler," Wikipedia, The Free Encyclopedia, retrieved from: <http://en.wikipedia.org/w/index.php?title=Interrupt_handler&oldid=505379869>, edited Aug. 2, 2012, 4 pages.

International Search Report and Written Opinion received for International Application No. PCT/US2014/018664, mailed May 29, 2014, 12 pages.

* cited by examiner

*Primary Examiner* — Tim T Vo
*Assistant Examiner* — Phong H Dang
(74) *Attorney, Agent, or Firm* — Barnes & Thornburg LLP (57) ABSTRACT

Technologies for system management interrupt ("SMI") handling include a number of processor cores configured to enter a system management mode ("SMM") in response to detecting an SMI. The first processor core to enter SMM and acquire a master thread lock sets an in-progress flag and executes a master SMI handler without waiting for other processor cores to enter SMM. Other processor cores execute a subordinate SMI handler. The master SMI handler may direct the subordinate SMI handlers to handle core-specific SMIs. The multi-core processor may set an SMI service pending flag in response to detecting the SMI, which is cleared by the processor core that acquires the master thread lock. A processor core entering SMM may immediately resume normal execution upon determining the in-progress flag is not set and the service pending flag is not set, to detect and mitigate spurious SMIs. Other embodiments are described and claimed.

17 Claims, 5 Drawing Sheets

SYSTEM MANAGEMENT INTERRUPT HANDLING FOR MULTI-CORE PROCESSORS

BACKGROUND

Computer processors typically provide several operating modes. Operating modes for ordinary code such as operating systems, user applications, and the like typically include real mode, in which the processor uses physical memory addresses, and protected mode, in which the processor uses virtualized memory addresses. Processors may provide additional modes, such as long mode for addressing a large address space.

Certain processors provide a special operating mode called System Management Mode ("SMM") for handling certain interrupts generated by hardware components of the computer platform, called System Management Interrupts ("SMIs"). Upon detecting an SMI, such a processor suspends execution by saving its current state and then entering SMM. Inside SMM, the processor executes SMI handler code. Such SMI handler code may perform tasks such as error handling, power management, platform flash memory updating, system management tasks, and the like. Upon completion, the SMI handler code executes a resume instruction ("RSM"), causing the processor to reload its saved state and resume execution of the previous operating mode. Receiving the SMI, entering SMM, and the operation of the SMI handler are thus transparent to other code executing on the processor, including operating system code.

Certain multi-core processors may handle an SMI by broadcasting the SMI to all processor cores. Upon receiving the SMI and entering SMM, each processor core may race to become the master core responsible for handling the SMI. Such master core is often called the "monarch" or the "boot strap processor." The master core waits for the other, subordinate cores (sometimes called "application processors") to enter SMM before handling the SMI. While the master core handles the SMI, the subordinate cores idle in a wait loop. Thus, SMI handler code may be single-threaded even when executed on multi-core processors.

Typical processors also include a machine check architecture. Such machine check architecture is a low-level mechanism to detect hardware errors in the processor or the computer platform ("machine check exceptions") and alert the operating system. Some machine check exceptions may be corrected in hardware or by the operating system; uncorrected machine check exceptions are generally fatal errors and may result in an operating system crash (e.g., a "stop error," "kernel panic," "blue screen," or the like).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 6:
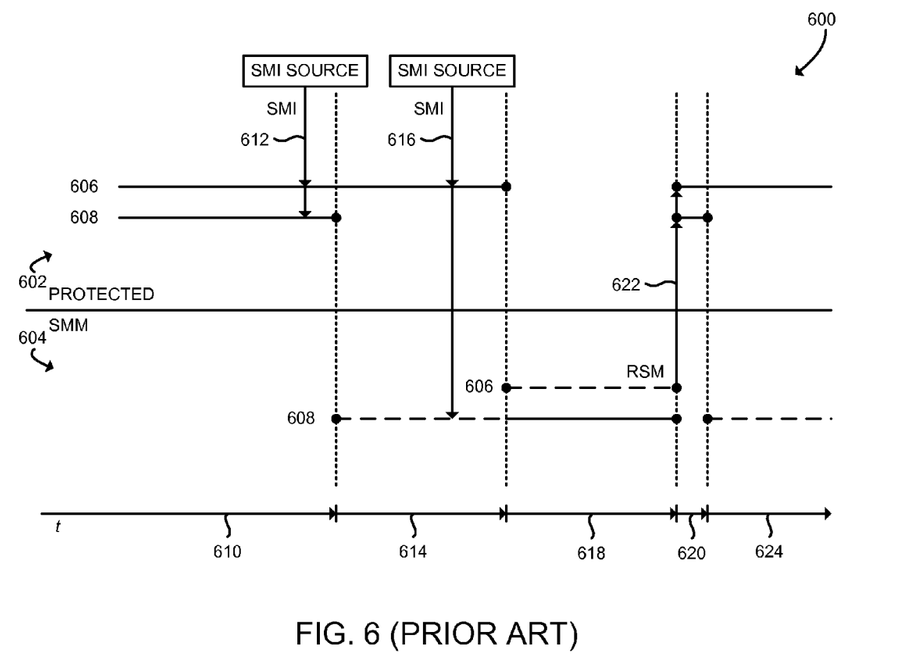
FIG. 6 is a schematic timeline diagram of a hang condition that may occur in typical processors.

Referring now to FIG. 6, typical multi-core processors may stall execution or "hang" when multiple SMIs are generated in close succession due to a phenomenon known as "SMI merging." A schematic diagram 600 illustrates the SMI merge issue. Regions 602 and 604 illustrate processor operation modes. In particular, region 602 illustrates protected mode and region 604 illustrates SMM. Of course, long mode, real mode, or another ordinary operating mode may be used instead of protected mode. Threads 606 and 608 are illustrated as initially executing in protected mode 602. During time period 610, an SMI source generates SMI 612, which is broadcast to both threads 606, 608. An SMI pending flag is set for each thread. At the boundary between time periods 610 and 614, thread 608 enters SMM 604. As thread 608 enters SMM, the SMI pending flag for thread 608 is automatically cleared. At this time, thread 606 is executing a longer instruction and remains in protected mode 602. During time period 614, an SMI source generates SMI 616, which is also broadcast to both threads 606 and 608. An SMI pending flag is again set for each thread 606, 608. Because the SMI pending flag was already set for thread 606, both the SMI 612 and the SMI 616 have effectively been merged together for thread 606. At the boundary between time periods 614 and 618, thread 606 enters SMM 604, automatically clearing the SMI pending flag for thread 606. Because thread 608 was already in SMM, the SMI pending bit for thread 608 remains set. During time period 618, thread 608 executes the SMI handler, which handles all pending SMIs, including SMI 612 and SMI 616. At the boundary between time periods 618 and 620, the threads 606, 608 execute RSM instruction 622 and return to protected mode 602. During time period 620, thread 608 immediately returns to SMM 604 because the SMI pending bit for thread 608 is still set. However, thread 606 remains in protected mode 602 because no SMI pending bit has been set for thread 606. Thus, thread 608 enters SMM 604 based on a spurious SMI. During time period 624, thread 608 waits idly for thread 606 to enter SMM 604, which will not happen without a timeout, inter-processor interrupt, or the like. Thus, due to the SMI merge, threads 606, 608 are out of sync and execution may be stalled.

Figure 1:
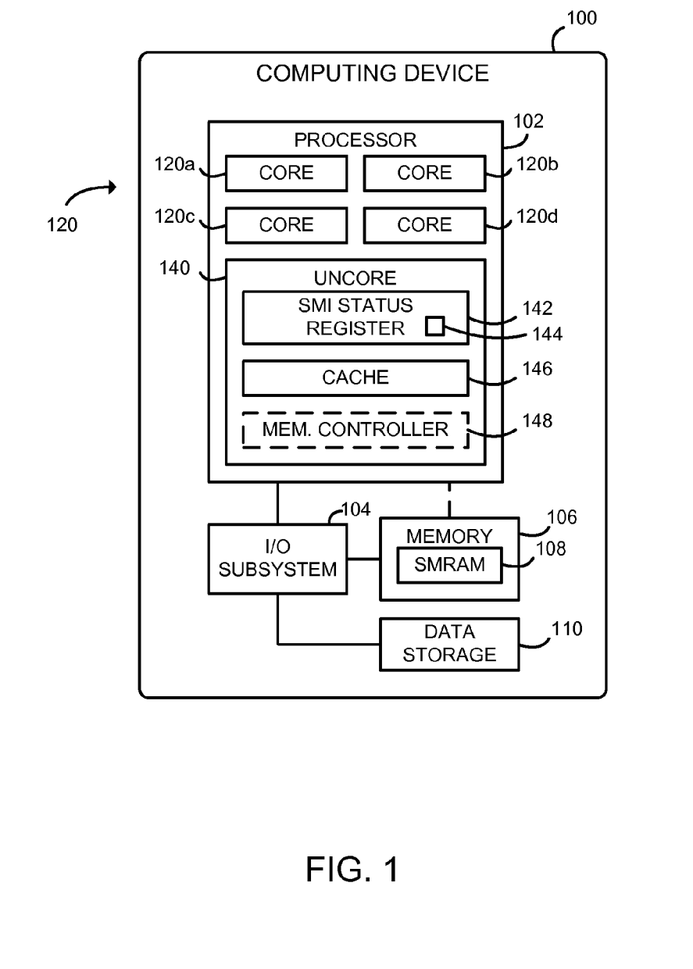
FIG. 1 is a simplified block diagram of at least one embodiment of a computing device for handling system management interrupts.

Referring now to FIG. 1, an illustrative computing device 100 for handing SMIs includes a multi-core processor 102 and an I/O subsystem 104, which both may generate SMIs. Upon receiving an SMI, the processor 102 designates a master processor core which begins handling the SMI without waiting for other processor cores to enter SMM. The master processor core may direct each of the other processor cores to handle those SMIs originating from the other processor cores. The processor 102 may avoid the SMI merge issue by detecting spurious SMIs and resuming execution quickly as discussed in detail below.

By initiating handling of the SMI without waiting for other processor cores to enter SMM, the processor 102 reduces latency for handling SMIs and increases scalability of SMI handling with increased core count. Directing the other processor cores to handle SMIs allows for handling SMIs originating from particular processor cores, because information relating to such SMIs is available only in the processor core that originated the SMI. Detecting spurious SMIs further reduces latency and improves scalability of SMI handling. Such improved latency and scalability may allow SMI-based handling of machine check exceptions.

The computing device 100 may be embodied as any type of device capable of performing the functions described herein. For example, the computing device 100 may be embodied as, without limitation, a computer, a smart phone, a tablet computer, a laptop computer, a notebook computer, a desktop computer, a workstation, a mobile computing device, a cellular telephone, a handset, a messaging device, a vehicle telematics device, a network appliance, a web appliance, a distributed computing system, a multiprocessor system, a processor-based system, a consumer electronic device, a digital television device, and/or any other computing device configured to handle system management interrupts. As shown in FIG. 1, the illustrative computing device 100 includes the processor 102, the I/O subsystem 104, a memory 106, and a data storage device 110. Of course, the computing device 100 may include other or additional components, such as those commonly found in a desktop computer (e.g., various input/output devices), in other embodiments. Additionally, in some embodiments, one or more of the illustrative components may be incorporated in, or otherwise from a portion of, another component. For example, the memory 106, or portions thereof, may be incorporated in the processor 102 in some embodiments.

The processor 102 may be embodied as any type of multi-core processor capable of performing the functions described herein. For example, the processor 102 may be embodied as a microprocessor, digital signal processor, microcontroller, or other processor or processing/controlling circuit. The processor 102 includes processor cores 120 and uncore 140. Each of the processor cores 120 is an independent processing unit capable of executing programmed instructions. The illustrative processor 102 includes four processor cores 120a through 120d; however any number of processor cores 120 may be included.

The uncore 140 includes any part of the processor 102 not included in the processor cores 120 such as, for example, a memory controller. The uncore 140 of the illustrative processor 102 includes an SMI status register 142. The SMI status register 142 is a memory location addressable by each of the processor cores 120. The SMI status register 142 includes an SMI service pending flag 144. The SMI service pending flag 144 is set by hardware of the processor 102 when an SMI is detected. The SMI service pending flag 144 also may be cleared by software executing on the processor cores 120. The SMI service pending flag 144 may contain any logical value when set; for example, when set the SMI service pending flag 144 may contain a logical high value, a logical low value, a zero value, or a non-zero value. In some embodiments, the SMI service pending flag 144 may be implemented as one bit of the SMI status register 142. Alternatively, the SMI service pending flag 144 may be an independent register. The uncore 140 further includes a cache memory 146, and some embodiments of the uncore 140 may include a memory controller 148. The cache memory 146 may be a last-level cache shared by the processor cores 120. During operation, both the cache memory 146 and the memory controller 148 may generate SMIs to be handled by the processor 102. Although not illustrated, the uncore 140 may additionally include typical components of a processor or a system-on-a-chip such as processor graphics, input/output controllers, or power management circuitry.

The processor 102 is communicatively coupled to the I/O subsystem 104, which may be embodied as circuitry and/or components to facilitate input/output operations with the processor 102, the memory 106, and other components of the computing device 100. For example, the I/O subsystem 104 may be embodied as, or otherwise include, memory controller hubs, platform controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 104 may generate SMIs or forward SMIs received from other components of the computing device 100. The I/O subsystem 104 may communicate SMIs to the processor 102 by asserting an electrical signal on a physical input pin of the processor 102. In some embodiments, the I/O subsystem 104 may form a portion of a system-on-a-chip (SoC) and be incorporated, along with the processor 102, the memory 106, and other components of the computing device 100, on a single integrated circuit chip.

The memory 106 may be embodied as any type of volatile or non-volatile memory or data storage capable of performing the functions described herein. In operation, the memory 106 may store various data and software used during operation of the computing device 100 such as operating systems, applications, programs, libraries, and drivers. As described above, the memory 106 may be communicatively coupled to the processor 102 via the I/O subsystem 104, or in some embodiments may be directly coupled to the processor 102 through the memory controller 148.

The memory 106 includes a memory region 108 accessible to the processor cores 120 while executing in SMM. This region, called the system management random access memory ("SMRAM"), includes executable code and data for SMI handling. The I/O subsystem 104 may regulate access to the SMRAM 108, preventing code from accessing or modifying the SMRAM 108 when not executing in SMM.

The data storage 110 may be embodied as any type of device or devices configured for short-term or long-term storage of data such as, for example, memory devices and circuits, memory cards, hard disk drives, solid-state drives, or other data storage devices. The data storage 110 may store software and/or firmware for SMI handling, including code that is installed into the SMRAM 108 during operation.

Figure 2:
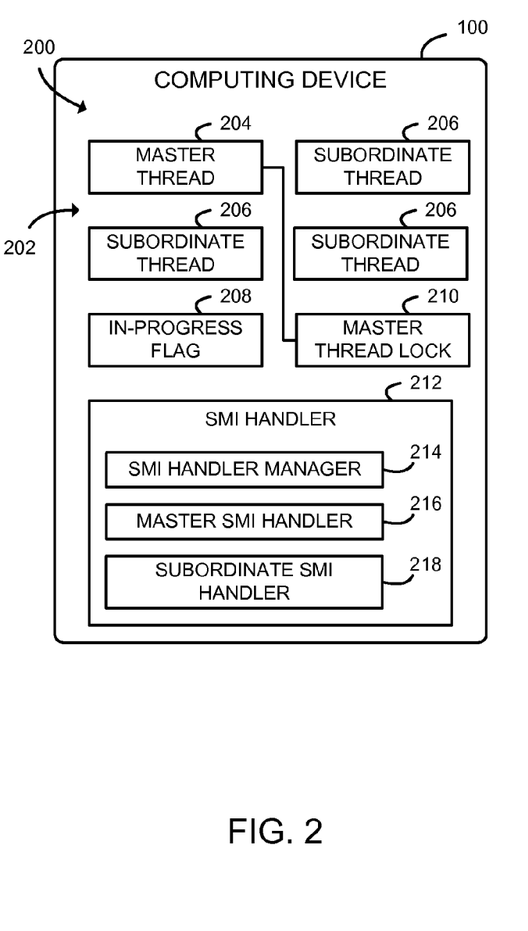
FIG. 2 is a simplified block diagram of at least one embodiment of an environment of the computing device of FIG. 1.

Referring now to FIG. 2, in one embodiment, the computing device 100 establishes an environment 200 during operation. The illustrative embodiment 200 includes threads 202, an in-progress flag 208, a master thread lock 210, and an SMI handler 212. The various modules of the environment 200 may be embodied as hardware, firmware, software, or a combination thereof.

Each of the threads 202 is an independent thread of execution corresponding to the architectural state of one of the process cores 120. That is, each of the threads 202 corresponds to a stream of instructions executed by one of the processor cores 120 as well as the corresponding register state of the processor core 120. Each of the threads 202 also may include or reference storage for thread-specific software flags. Such software flags may be stored in the memory 106 or at other levels of the memory hierarchy. The threads 202 include one master thread 204 and a number of subordinate threads 206. The assignment of the master thread 204 and the subordinate threads 206 is described in detail below. Note that the illustrative embodiment 200 includes four threads—one master thread 204 and three subordinate threads 206—however, in other embodiments any number of threads 202 may be included. Also, in the illustrative embodiment, the threads 202 and the processor cores 120 are in a one-to-one relationship. In other embodiments, different relationships may exist. For example, in a symmetric multithreading processor, two threads 202 may execute on a single processor core 120.

The in-progress flag 208 may be embodied as a memory location indicating whether a master thread 204 has been designated, which indicates that SMI handler code is currently in progress. The in-progress flag 208 may contain any logical value to indicate SMI handler code is currently in progress; for example a logical high value, a logical low value, a non-zero value, or a zero value. The in-progress flag 208 is initially cleared, meaning that SMI handler code is not currently in progress. As described in detail below, the in-progress flag 208 is managed by software. The in-progress flag 208 may be embodied as a location in the memory 106 or in the SMRAM 108.

The master thread lock 210 is a synchronization mechanism used to select one of the threads 202 as the master thread 204. As described in detail below, upon entering SMM, the threads 202 may race to acquire the master thread lock 210, with the winner of the race becoming the master thread 204. Upon acquiring the master thread lock 210, the master thread 204 may set the in-progress flag 208. The master thread lock 210 may be embodied as a hardware register of the computing device 100, or as a software lock stored in the memory 106 or the SMRAM 108.

The SMI handler 212 is configured to handle SMI interrupts. As described in detail below, the SMI handler 212 manages the in-progress flag 208, selects the master thread 204, and handles SMIs generated by the processor cores 120, the uncore 140, and the I/O subsystem 104. In some embodiments, those functions may be performed by sub-modules, for example, by an SMI handler manager 214, a master SMI handler 216, or a subordinate SMI handler 218.

Figure 3:
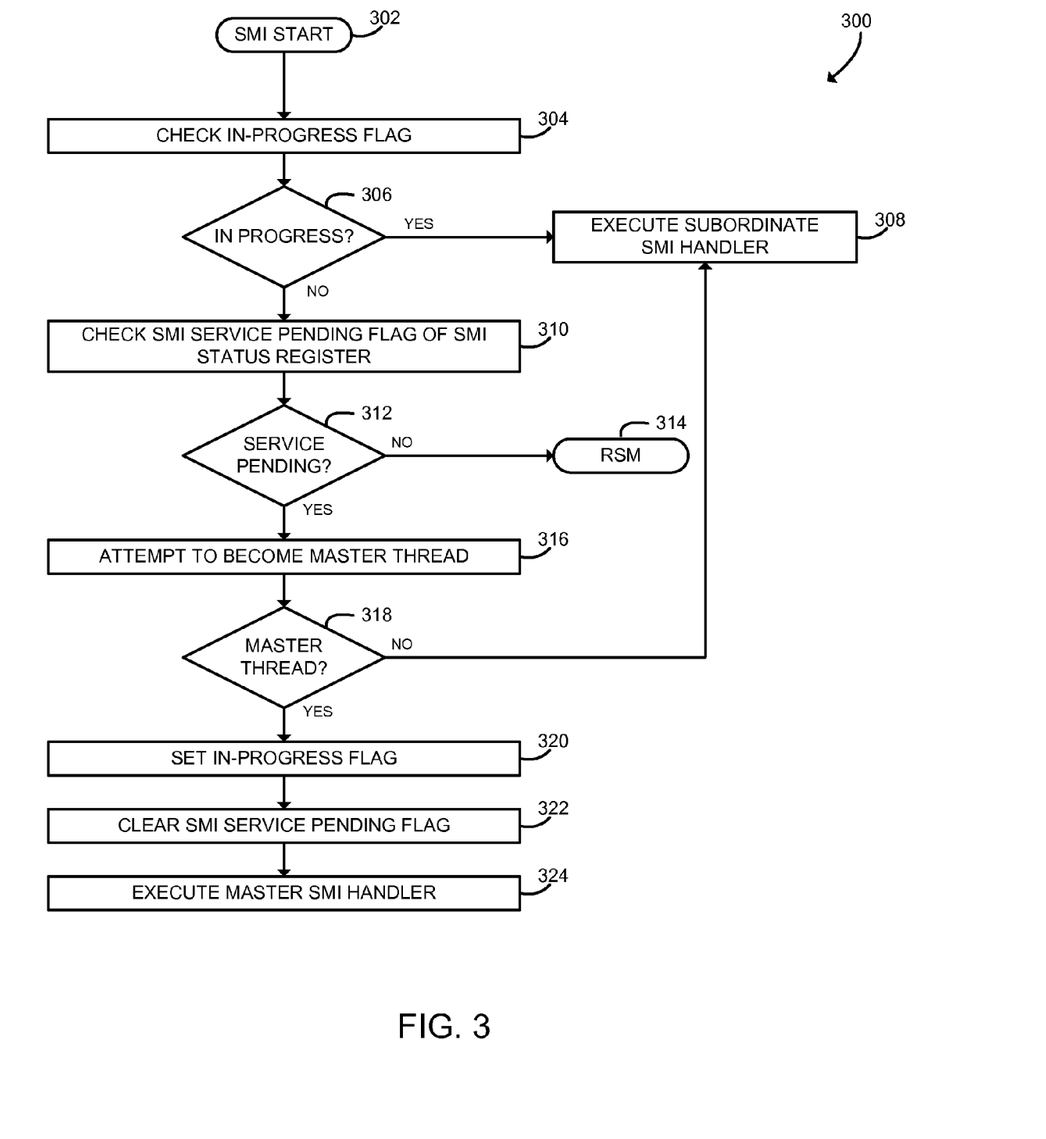
FIG. 3 is a simplified flow diagram of at least one embodiment of a method for handling system management interrupts that may be executed by the computing device of FIGS. 1 and 2.

Referring now to FIG. 3, in use, the computing device 100 may execute a method 300 for handling SMIs. The method 300 may be executed as part of the SMI handler manager 214 by each of the threads 202. The method 300 begins with block 302, in which the computing device 100 detects an SMI and a processor core 120 enters SMM. As described above, the SMI may originate from one of the processor cores 120, from the uncore 140, or from the I/O subsystem 104. The I/O subsystem, in particular, may raise an SMI based on input received from other components of the computing device 100. In some embodiments, an SMI may be raised in response to a machine check exception generated by a machine check architecture of the processor 102. In some embodiments, a so-called "software SMI" may be generated by code executing on the processor 102 that writes to a designated address in I/O address space. In response to detecting such a write from the processor 102, the I/O subsystem 104 may generate an SMI. Regardless of source, the SMI is asynchronous, meaning an SMI may be raised at any time, including when the processor cores 120 are currently executing instructions. When an SMI is generated, an SMI pending flag (not illustrated) is set for each of the processor cores 120. As each processor core 120 completes the current instruction, reaching an instruction boundary, if the SMI pending flag is set the processor core 120 transitions into SMM. The current context of the processor core 120 is saved into the SMRAM 108, the SMI pending flag is cleared, and the SMI service pending flag 144 is set. Once in SMM, the processor core 120 executes instructions for thread 202, starting with the SMI handler manager 214.

In block 304, the thread 202 reads the in-progress flag 208. In block 306, the thread 202 determines whether the in-progress flag 208 is set. As described in more detail below, the in-progress flag 208 is set by a thread 202 upon being designated the master thread 204. Thus, if the in-progress flag 208 is already set in block 304, then another thread 202 has already become the master thread 204 and the current thread 202 is therefore a subordinate thread 206. If the in-progress flag 208 is set, then the method 300 branches to block 308. In block 308, the thread 202 executes the subordinate SMI handler 218, described in detail below with respect to FIG. 5.

Referring back to block 306, if the in-progress flag 208 is not set, the method 300 advances to block 310 in which, the thread 202 reads the SMI service pending flag 144 of the SMI status register 142. The SMI service pending flag 144 indicates whether an SMI has been generated and has not yet been handled. As described above, the SMI service pending flag 144 is set by hardware of the processor 102 and is cleared by software executing on the processor cores 120.

In block 312, the thread 202 determines whether the SMI service pending flag 144 is set. If the SMI service pending flag 144 is not set, then the method 300 branches to block 314. In block 314, the thread 202 executes the RSM instruction.

Upon executing the RSM instruction, the context of the processor core 120 saved in the SMRAM 108 is loaded into the appropriate registers of the processor core 120, and the processor core 120 resumes execution in its previous mode of operation. For example, the processor core 120 may resume execution in protected mode, long mode, or real mode. As described above, the method 300 reaches block 314 in situations where the in-progress flag 208 and the SMI service pending flag 144 are both not set. Such conditions occur as a result of spurious SMIs as described above in connection with FIG. 6; that is, when an SMI merge condition has caused the threads 202 to lose synchronization. The SMI service pending flag 144 allows the processor 102 to track such spurious SMIs and resume execution quickly without excessive idle time.

Referring back to block 312, if the SMI service pending flag 144 is set, the method 300 advances to block 316. In block 316, the thread 202 attempts to become the master thread 204. The thread 202 may do so by attempting to acquire the master thread lock 210. As discussed above, the master thread lock 210 may be embodied as any synchronization mechanism suitable for selecting a single thread 202. In some embodiments, the master thread lock 210 may be embodied as a hardware register, for example as a boot flag register ("BOFL"). The BOFL is accessible to all of the threads 202. When the BOFL is read by one of the threads, the contents of the BOFL are cleared. Assuming the BOFL initially holds a non-zero value, the first thread 202 to read the BOFL receives that non-zero value. Any subsequent thread 202 to read the BOFL receives a zero value. Thus, the BOFL may be used to implement a hardware semaphore. In some embodiments, the master thread lock 210 may be implemented as a software lock, for example a semaphore, a mutex, a spinlock, or the like.

In block 318, the thread 202 determines whether it successfully became the master thread 204. If not, the method 300 branches to block 308 to execute the subordinate SMI handler 218 as described below with respect to FIG. 5. If the thread 202 successfully became the master thread 204, the method 300 advances to block 320.

In block 320, the thread 202 sets the in-progress flag 208. As described above, with respect to block 306, after the in-progress flag 208 is set, subsequent threads 202 may immediately execute the subordinate SMI handler 218 without attempting to acquire the master thread lock 210. In block 322, the thread 202 clears the SMI service pending flag 144. The SMI service pending flag 144 is cleared before handling the SMI to ensure that spurious SMIs are detected correctly. In block 324, the thread 202 executes the master SMI handler 216, as described in detail below with respect to FIG. 4. The thread 202 executes the master SMI handler 216 without waiting for any other of the threads 202 to enter SMM.

Figure 4:
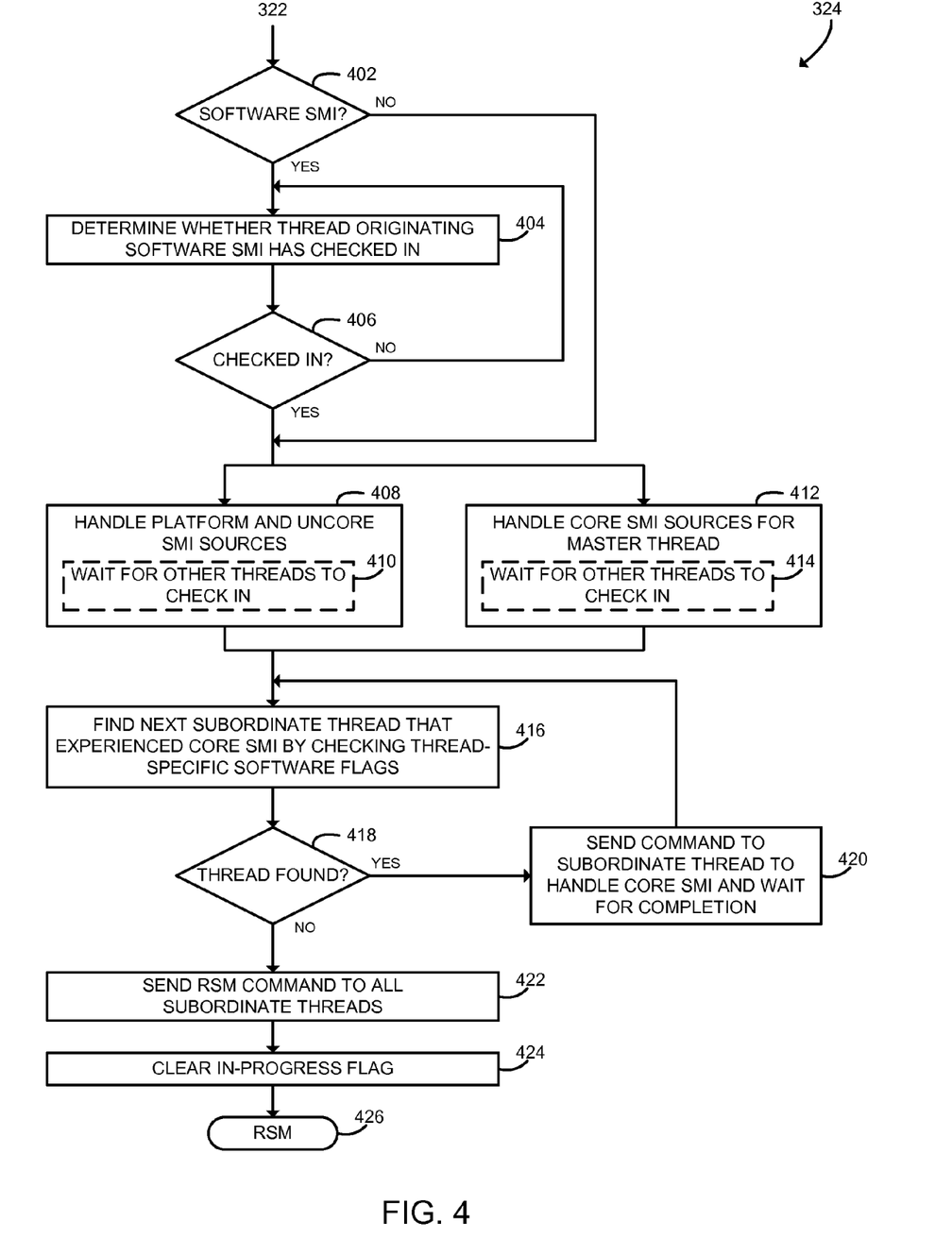
FIG. 4 is a simplified flow diagram of at least one embodiment of a method for a master SMI handler that may be executed by the computing device of FIGS. 1 and 2.

Referring now to FIG. 4, in use, the computing device 100 may execute a method 324 for handling SMIs. The method 324 may be embodied as the master SMI handler 216, which is executed by the single master thread 204. As described above, such master thread 204 has already been designated before execution of the method 324. The method 324 begins in block 402, in which the master thread 204 determines whether the SMI is a software-generated SMI. The master thread 204 may make such determination by reading registers of the computing device 100. If the SMI is a software-generated SMI, the method 324 advances to block 404.

In block 404, the master thread 204 determines whether a thread 202 that originated the software SMI has checked in to SMM. The originating thread 202 may be the only thread 202 capable of handling such a software SMI. The originating thread 202 may be the master thread 204 itself. Each of the threads 202 may check in to SMM using any method of inter-process communication, for example by using globally accessible software flags. The master thread 204 may determine the identity of the thread 202 that originated the SMI by comparing register values associated with the SMI to saved state values stored in the SMRAM 108. For example, the master thread 204 may determine whether a thread 202 with an IO_MISC value stored in the SMRAM 108 matches the IO_MISC value associated with the software SMI.

In block 406, if the master thread 204 has determined that a thread 202 that generated the software SMI has not checked in, the method 324 loops back to block 404 to continue waiting for such thread 202 to check in. If the master thread 204 determines that a thread 202 that generated the software SMI has checked in, the method 324 advances to blocks 408 and 412.

Referring back to block 402, if the master thread 204 determines that the SMI is not a software-generated SMI, the method 324 advances to blocks 408 and 412. In block 408, the master thread 204 handles SMIs generated from the computing device 100 and the uncore 140; that is, SMIs generated from components of the computing device 100 other than the processor cores 120. The master thread 204 may determine what SMIs need to be handled by querying status registers maintained in the SMRAM 108, the memory 106, or the I/O subsystem 104. The master thread 204 may handle such SMIs by correcting memory errors, logging errors for reporting to the operating system, performing power management activities, etc. The master thread 204 may handle such SMIs by calling appropriate sub-handlers (not illustrated).

In some embodiments, in block 410 the master thread 204 may wait for other threads 202 to check in to SMM. Handling certain SMI sources may require accessing resources shared among the processor cores 120; therefore, to prevent conflicts with operating system code or other code executing on other processor cores 120, the master thread 204 may wait for other threads 202 to enter SMM. For example, SMI handlers requiring input or output across a PCI bus may wait for other threads 202 to enter SMM because reads and writes to the PCI bus are non-atomic. To prevent excessive latency, the master thread 204 should not wait for other threads 202 when the particular SMI to be handled does not post a potential conflict with the other threads 202.

In block 412, the master thread 204 handles SMIs generated by the processor core 120 on which the master thread 204 is executing ("core SMIs"). Again, the master thread 204 may determine the core SMIs to be handled by querying status registers maintained in the SMRAM 108 or in the processor core 120. In the case of core SMIs, such status information may only be accessible to the master thread 204 executing on the processor core 120. In some embodiments, in block 414 the master thread 204 may wait for other threads 202 to enter SMM, as discussed above with respect to block 410. Further, although illustrated in parallel, blocks 408 and 412 may be executed sequentially and in any order. After execution of both blocks 408 and 412, the method 324 advances to block 416.

In block 416, the master thread 204 finds the next subordinate thread 206 assigned to a processor core 120 that generated a core SMI. The master thread 204 may find such subordinate thread 206 by searching a group of thread-specific software flags. As described below, such thread-specific software flags may be set by the subordinate SMI handler 218. In block 418, the master thread 204 determines if a subordinate thread 206 has been found. If so, the method 324 branches to block 420.

In block 420, the master thread 204 sends a command to the subordinate thread 206 to cause the subordinate thread 206 to handle the core SMI. As described above, status registers for SMIs generated by the processor cores 120 may only be accessible to the particular thread 202 running on the processor core 120. The master thread 204 may send the command using any form of inter-process communication, for example, by releasing a lock, signaling a semaphore, raising an interrupt, initiating a remote procedure call, etc. The master thread 204 waits for the subordinate thread 206 to complete handling the SMI before continuing, which effectively serializes SMI handling. After handling is completed, the method 324 loops back to block 416 to find the next subordinate thread 206 to experience a core SMI.

Referring back to block 418, if no subordinate thread 206 experiencing a core SMI was found, the method 324 advances to block 422. At this point, all SMI sources have been handled and the processor 102 is ready to resume ordinary operation. In block 422, the master thread 204 sends the RSM command to all subordinate threads 206. As described below, upon receiving this command the processor cores 120 for the subordinate threads 206 resume operation in the previous execution mode.

In block 424, the master thread 204 clears the in-progress flag 208. Clearing the in-progress flag 208 prepares the processor 102 to handle another SMI. In block 426, the master thread 204 executes the RSM instruction, which causes the processor core 120 to exit SMM and resume the previous operating mode.

Figure 5:
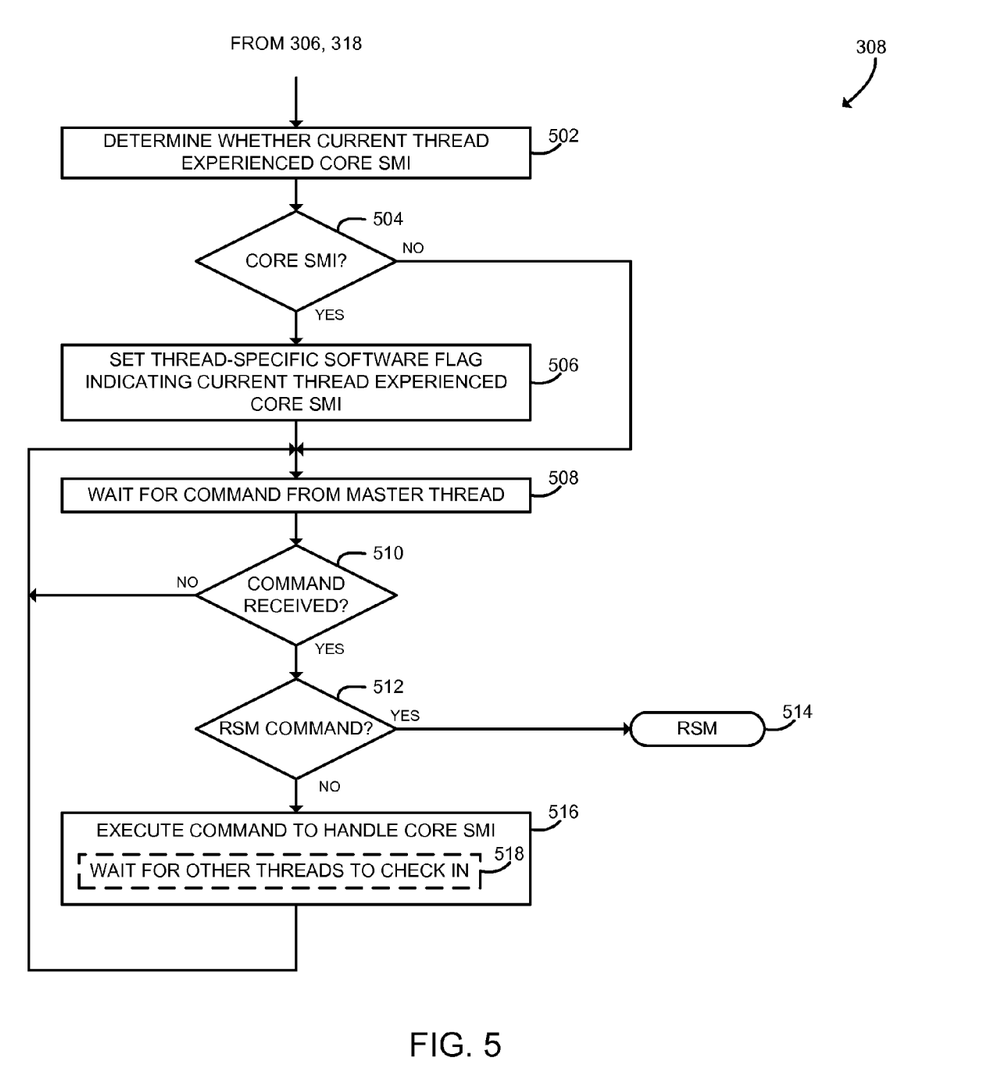
FIG. 5 is a simplified flow diagram of at least one embodiment of a method for a subordinate SMI handler that may be executed by the computing device of FIGS. 1 and 2.

Referring now to FIG. 5, in use, the computing device 100 may execute a method 308 for handling SMIs. The method 308 may be embodied as the subordinate SMI handler 218, which may be executed by one or more of the subordinate threads 206. As described above, before execution of the method 308, such subordinate threads 206 have already been designated based on failing to acquire the master thread lock 210 or based on entering SMM after the master thread 204 has been designated. The method 308 begins with block 502, in which the subordinate thread 206 determines whether it has experienced a core SMI. As described above, a thread 202 experiences a core SMI when the SMI is generated by the particular processor core 120 on which the thread 202 is executing. The subordinate thread 206 may make such determination by querying status registers of the computing device 100 and/or the processor 102.

In block 504, if the subordinate thread 206 experienced a core SMI, the method 308 advances to block 506. In block 506, the subordinate thread 206 sets a thread-specific software flag indicating that the current thread 202 experienced a core SMI. As described above, the master thread 204 may read such software flag when determining whether to direct the subordinate thread 206 to handle the core SMI. Referring back to block 504, if the subordinate thread 206 did not experience a core SMI, the method 308 skips ahead to block 508.

In block 508, the subordinate thread 206 waits for a command from the master thread 204. As described above, the master thread 204 may send such command using any form of interprocess communication. In block 510, the subordinate thread 206 determines whether a command has been received. If not, the method 308 loops back to block 508 to continue waiting for more commands from the master thread 204. If a command has been received, the method 308 advances to block 512.

In block 512, the subordinate thread 206 determines whether the RSM command has been received from the master thread 204. If so, the method 308 branches to block 514. In block 514, the subordinate thread 206 executes the RSM instruction, which causes the processor core 120 to exit SMM and resume operation in the previous execution mode. Referring back to block 512, if the command is not the RSM command, the method 308 advances to block 516.

In block 516, the subordinate thread 206 handles the core SMI. As described above, handling the core SMI may include correcting memory errors for the processor core 120 and reporting corrected errors to the operating system. The subordinate thread 206 may execute sub-handlers for the particular core SMI being handled. In some embodiments, in block 518 the subordinate thread 206 may wait for other threads 202 to enter SMM, as discussed above with respect to blocks 410 and 414. After handling the core SMI, the method 308 loops back to block 508 to continue waiting for more commands from the master thread 204.

EXAMPLES

Example 1 includes a multi-core processor to handle a system management interrupt generated in a computing device, the multi-core processor comprising a processor core to (i) enter a system management mode in response to detection of the system management interrupt by the multi-core processor and (ii) execute a system management interrupt handler manager in response to entrance of the system management mode, the system management interrupt handler manager to determine whether an in-progress flag is set, the in-progress flag to indicate another processor core of the multi-core processor has acquired a master thread lock of the computing device; attempt to acquire the master thread lock in response to a determination that the in-progress flag is not set; set the in-progress flag in response to acquisition of the master thread lock; and execute a master system management interrupt handler in response to the acquisition of the master thread lock.

Example 2 includes the subject matter of Example 1, and further including a subordinate processor core, wherein the system management interrupt handler manager is further to execute the master system management interrupt handler without a wait for the subordinate processor core to enter the system management mode.

Example 3 includes the subject matter of any of Examples 1 and 2, and further including a system management interrupt service pending flag, wherein the multi-core processor is to set the system management interrupt service pending flag in response to the detection of the system management interrupt; and the system management interrupt handler manager is further to determine whether the system management interrupt service pending flag is set in response to the determination that the in-progress flag is not set, resume an execution mode of the processor core in response to a determination that the system management interrupt service pending flag is not set, attempt to acquire the master thread lock in response to a determination that the system management interrupt service pending flag is set, and clear the system management interrupt service pending flag in response to the acquisition of the master thread lock and prior to execution of the master system management interrupt handler.

Example 4 includes the subject matter of any of Examples 1-3, and further including a system management interrupt status register, wherein the system management interrupt service pending flag comprises a system management interrupt service pending bit of the system management interrupt status register.

Example 5 includes the subject matter of any of Examples 1-4, and wherein the execution mode of the processor core comprises one of: a protected mode, a long mode, or a real mode.

Example 6 includes the subject matter of any of Examples 1-5, and wherein the master thread lock comprises a hardware register of the computing device.

Example 7 includes the subject matter of any of Examples 1-6, and wherein the master thread lock comprises a software lock of the computing device.

Example 8 includes the subject matter of any of Examples 1-7, and wherein the processor core comprises a subordinate processor core, and the system management interrupt handler manager is further to execute a subordinate system management interrupt handler in response to a determination that the in-progress flag is set; and execute the subordinate system management interrupt handler in response to failure to acquire the master thread lock.

Example 9 includes the subject matter of any of Examples 1-8, and further including a master processor core different from the subordinate processor core, wherein the subordinate system management interrupt handler is to determine whether the subordinate processor core is a source of the system management interrupt; receive a command from the master processor core to handle the system management interrupt in response to a determination that the subordinate processor core is the source of the system management interrupt; and handle the system management interrupt in response to receipt of the command from the master processor core.

Example 10 includes the subject matter of any of Examples 1-9, and wherein the subordinate system management interrupt handler is further to set a flag to indicate the subordinate processor core is the source of the system management interrupt in response to the determination that the subordinate processor core is the source of the system management interrupt.

Example 11 includes the subject matter of any of Examples 1-10, and further including a second subordinate processor core, wherein the subordinate system management interrupt handler is further to wait for the second subordinate processor core to enter the system management mode.

Example 12 includes the subject matter of any of Examples 1-11, and wherein the subordinate system management interrupt handler is further to handle a machine check exception generated by a machine check architecture of the computing device.

Example 13 includes the subject matter of any of Examples 1-12, and wherein the subordinate system management interrupt handler is further to correct a memory error of the subordinate processor core and report the corrected error to an operating system of the computing device.

Example 14 includes the subject matter of any of Examples 1-13, and wherein the master system management interrupt handler is to clear the in-progress flag.

Example 15 includes the subject matter of any of Examples 1-14, and wherein the processor core comprises a master processor core, and the master system management interrupt handler is further to determine whether the system management interrupt was generated by a component of the computing device other than a processor core; and handle the system management interrupt in response to a determination that the system management interrupt was generated by the component of the computing device other than a processor core.

Example 16 includes the subject matter of any of Examples 1-15, and wherein the master system management interrupt handler is further to determine whether the system management interrupt was generated by the master processor core; and handle the system management interrupt in response to a determination that the system management interrupt was generated by the master processor core.

Example 17 includes the subject matter of any of Examples 1-16, and wherein the master system management interrupt handler is further to handle a machine check exception generated by a machine check architecture of the computing device.

Example 18 includes the subject matter of any of Examples 1-17, and wherein the master system management interrupt handler is further to correct a memory error of the computing device and report the corrected error to an operating system of the computing device.

Example 19 includes the subject matter of any of Examples 1-18, and further including a subordinate processor core different from the processor core, wherein the processor core comprises a master processor core and the master system management interrupt handler is further to determine whether the subordinate processor core is a source of the system management interrupt; send a command to the subordinate processor core to handle the system management interrupt in response to a determination that the subordinate processor core is the source of the system management interrupt; and wait for the subordinate processor core to complete the handle of the system management interrupt.

Example 20 includes the subject matter of any of Examples 1-19, and wherein the master system management interrupt handler is further to read a flag to indicate the subordinate processor core is the source of the system management interrupt, the flag to be set by the subordinate processor core.

Example 21 includes a method for handling a system management interrupt generated in a computing device, the method comprising entering, by a processor core of the computing device, a system management mode of the processor core in response to detecting the system management interrupt; determining, by the processor core, whether an in-progress flag is set, the in-progress flag to indicate another processor core of the computing device has acquired a master thread lock of the computing device; attempting, by the processor core, to acquire the master thread lock in response to determining the in-progress flag is not set; setting, by the processor core, the in-progress flag in response to acquiring the master thread lock; and executing, by the processor core, a master system management interrupt handler in response to acquiring the master thread lock.

Example 22 includes the subject matter of Example 21, and wherein executing the master system management interrupt handler comprises executing the master system management interrupt handler without waiting for a subordinate processor core of the computing device to enter the system management mode.

Example 23 includes the subject matter of any of Examples 21 and 22, and further including determining, by the processor core, whether a system management interrupt service pending flag of the computing device is set in response to determining the in-progress flag is not set, wherein the system management interrupt service pending flag is to be set by a processor of the computing device in response to detecting the system management interrupt; resuming, by the processor core, an execution mode of the processor core in response to determining the system management interrupt service pending flag is not set; and clearing, by the processor core, the system management interrupt service pending flag in response to acquiring the master thread lock and prior to executing the master system management interrupt handler; wherein attempting to acquire the master thread lock further comprises attempting to acquire the master thread lock in response to determining the system management interrupt service pending flag is set.

Example 24 includes the subject matter of any of Examples 21-23, and wherein determining whether the system management interrupt service pending flag is set comprises determining whether a service pending bit of a system management interrupt status register of the processor is set.

Example 25 includes the subject matter of any of Examples 21-24, and wherein resuming the execution mode comprises one of: resuming a protected mode, resuming a long mode, or resuming a real mode.

Example 26 includes the subject matter of any of Examples 21-25, and wherein attempting to acquire the master thread lock comprises attempting to read a hardware register of the computing device.

Example 27 includes the subject matter of any of Examples 21-26, and wherein attempting to acquire the master thread lock comprises attempting to acquire a software lock of the computing device.

Example 28 includes the subject matter of any of Examples 21-27, and wherein the processor core comprises a subordinate processor core, the method further comprising executing, by the subordinate processor core, a subordinate system management interrupt handler in response to determining the in-progress flag is set; and executing, by the subordinate processor core, the subordinate system management interrupt handler in response to not acquiring the master thread lock.

Example 29 includes the subject matter of any of Examples 21-28, and wherein executing the subordinate system management interrupt handler comprises determining, by the subordinate processor core, whether the subordinate processor core is a source of the system management interrupt; receiving, by the subordinate processor core, a command from a master processor core of the computing device, different from the subordinate processor core, to handle the system management interrupt in response to determining the subordinate processor core is the source of the system management interrupt; and handling, by the subordinate processor core, the system management interrupt in response to receiving the command from the master processor core.

Example 30 includes the subject matter of any of Examples 21-29, and further including setting, by the subordinate processor core, a flag indicating the subordinate processor core is the source of the system management interrupt in response to determining the subordinate processor core is the source of the system management interrupt.

Example 31 includes the subject matter of any of Examples 21-30, and wherein handling the system management interrupt further comprises waiting for a second subordinate processor core of the computing device to enter the system management mode.

Example 32 includes the subject matter of any of Examples 21-31, and wherein handling the system management interrupt comprises handling a machine check exception generated by a machine check architecture of the computing device.

Example 33 includes the subject matter of any of Examples 21-32, and wherein handling the machine check exception comprises correcting a memory error of the subordinate processor core and reporting the corrected error to an operating system of the computing device.

Example 34 includes the subject matter of any of Examples 21-33, and wherein executing the master system management interrupt handler comprises clearing the in-progress flag.

Example 35 includes the subject matter of any of Examples 21-34, and wherein the processor core comprises a master processor core and wherein executing the master system management interrupt handler comprises determining, by the master processor core, whether the system management interrupt was generated by a component of the computing device other than a processor core; and handling, by the master processor core, the system management interrupt in response to determining the system management interrupt was generated by the component of the computing device other than a processor core.

Example 36 includes the subject matter of any of Examples 21-35, and wherein executing the master system management interrupt handler further comprises determining, by the master processor core, whether the system management interrupt was generated by the master processor core; and handling, by the master processor core, the system management interrupt in response to determining the system management interrupt was generated by the master processor core.

Example 37 includes the subject matter of any of Examples 21-36, and wherein handling the system management interrupt comprises handling a machine check exception generated by a machine check architecture of the computing device.

Example 38 includes the subject matter of any of Examples 21-37, and wherein handling the machine check exception comprises correcting a memory error of the computing device and reporting the corrected error to an operating system of the computing device.

Example 39 includes the subject matter of any of Examples 21-38, and wherein the processor core comprises a master processor core and wherein executing the master system management interrupt handler comprises determining, by the master processor core, whether a subordinate processor core of the computing device, different from the master processor core, is a source of the system management interrupt; sending, by the master processor core, a command to the subordinate processor core to handle the system management interrupt in response to determining the subordinate processor core is the source of the system management interrupt; and waiting, by the master processor core, for the subordinate processor core to complete handling the system management interrupt.

Example 40 includes the subject matter of any of Examples 21-39, and wherein determining whether the subordinate processor core of the computing device is the source of the system management interrupt comprises reading a flag indicating the subordinate processor core is the source of the system management interrupt, the flag to be set by the subordinate processor core.

Example 41 includes a computing device comprising a processor; and a memory having stored therein a plurality of instructions that when executed by the processor cause the computing device to perform the method of any of Examples 21-40.

Example 42 includes one or more machine readable storage media comprising a plurality of instructions stored thereon that in response to being executed result in a computing device performing the method of any of Examples 21-40.

Example 43 includes a computing device to handle a system management interrupt generated in the computing device, the computing device comprising means for entering, by a processor core of the computing device, a system management mode of the processor core in response to detecting the system management interrupt; means for determining, by the processor core, whether an in-progress flag is set, the in-progress flag to indicate another processor core of the computing device has acquired a master thread lock of the computing device; means for attempting, by the processor core, to acquire the master thread lock in response to determining the in-progress flag is not set; means for setting, by the processor core, the in-progress flag in response to acquiring the master thread lock; and means for executing, by the processor core, a master system management interrupt handler in response to acquiring the master thread lock.

Example 44 includes the subject matter of Example 43, and wherein the means for executing the master system management interrupt handler comprises means for executing the master system management interrupt handler without waiting for a subordinate processor core of the computing device to enter the system management mode.

Example 45 includes the subject matter of any of Examples 43 and 44, and further including means for determining, by the processor core, whether a system management interrupt service pending flag of the computing device is set in response to determining the in-progress flag is not set, wherein the system management interrupt service pending flag is to be set by a processor of the computing device in response to detecting the system management interrupt; means for resuming, by the processor core, an execution mode of the processor core in response to determining the system management interrupt service pending flag is not set; and means for clearing, by the processor core, the system management interrupt service pending flag in response to acquiring the master thread lock and prior to executing the master system management interrupt handler; wherein the means for attempting to acquire the master thread lock further comprises means for attempting to acquire the master thread lock in response to determining the system management interrupt service pending flag is set.

Example 46 includes the subject matter of any of Examples 43-45, and wherein the means for determining whether the system management interrupt service pending flag is set comprises means for determining whether a service pending bit of a system management interrupt status register of the processor is set.

Example 47 includes the subject matter of any of Examples 43-46, and wherein the means for resuming the execution mode comprises one of: means for resuming a protected mode, means for resuming a long mode, or means for resuming a real mode.

Example 48 includes the subject matter of any of Examples 43-47, and wherein the means for attempting to acquire the master thread lock comprises means for attempting to read a hardware register of the computing device.

Example 49 includes the subject matter of any of Examples 43-48, and wherein means for attempting to acquire the master thread lock comprises means for attempting to acquire a software lock of the computing device.

Example 50 includes the subject matter of any of Examples 43-49, and wherein the processor core comprises a subordinate processor core, the computing device further comprising means for executing, by the subordinate processor core, a subordinate system management interrupt handler in response to determining the in-progress flag is set; and means for executing, by the subordinate processor core, the subordinate system management interrupt handler in response to not acquiring the master thread lock.

Example 51 includes the subject matter of any of Examples 43-50, and wherein the means for executing the subordinate system management interrupt handler comprises means for determining, by the subordinate processor core, whether the subordinate processor core is a source of the system management interrupt; means for receiving, by the subordinate processor core, a command from a master processor core of the computing device, different from the subordinate processor core, to handle the system management interrupt in response to determining the subordinate processor core is the source of the system management interrupt; and means for handling, by the subordinate processor core, the system management interrupt in response to receiving the command from the master processor core.

Example 52 includes the subject matter of any of Examples 43-51, and further including means for setting, by the subordinate processor core, a flag indicating the subordinate processor core is the source of the system management interrupt in response to determining the subordinate processor core is the source of the system management interrupt.

Example 53 includes the subject matter of any of Examples 43-52, and wherein the means for handling the system management interrupt further comprises means for waiting for a second subordinate processor core of the computing device to enter the system management mode.

Example 54 includes the subject matter of any of Examples 43-53, and wherein the means for handling the system management interrupt comprises means for handling a machine check exception generated by a machine check architecture of the computing device.

Example 55 includes the subject matter of any of Examples 43-54, and wherein the means for handling the machine check exception comprises means for correcting a memory error of the subordinate processor core and reporting the corrected error to an operating system of the computing device.

Example 56 includes the subject matter of any of Examples 43-55, and wherein the means for executing the master system management interrupt handler comprises means for clearing the in-progress flag.

Example 57 includes the subject matter of any of Examples 43-56, and wherein the processor core comprises a master processor core and wherein the means for executing the master system management interrupt handler comprises means for determining, by the master processor core, whether the system management interrupt was generated by a component of the computing device other than a processor core; and means for handling, by the master processor core, the system management interrupt in response to determining the system management interrupt was generated by the component of the computing device other than a processor core.

Example 58 includes the subject matter of any of Examples 43-57, and wherein the means for executing the master system management interrupt handler further comprises means for determining, by the master processor core, whether the system management interrupt was generated by the master processor core; and means for handling, by the master processor core, the system management interrupt in response to determining the system management interrupt was generated by the master processor core.

Example 59 includes the subject matter of any of Examples 43-58, and wherein the means for handling the system management interrupt comprises means for handling a machine check exception generated by a machine check architecture of the computing device.

Example 60 includes the subject matter of any of Examples 43-59, and wherein the means for handling the machine check exception comprises means for correcting a memory error of the computing device and reporting the corrected error to an operating system of the computing device.

Example 61 includes the subject matter of any of Examples 43-60, and wherein the processor core comprises a master processor core and wherein means for executing the master system management interrupt handler comprises means for determining, by the master processor core, whether a subordinate processor core of the computing device, different from the master processor core, is a source of the system management interrupt; means for sending, by the master processor core, a command to the subordinate processor core to handle the system management interrupt in response to determining the subordinate processor core is the source of the system management interrupt; and means for waiting, by the master processor core, for the subordinate processor core to complete handling the system management interrupt.

Example 62 includes the subject matter of any of Examples 43-61, and wherein the means for determining whether the subordinate processor core of the computing device is the source of the system management interrupt comprises means for reading a flag indicating the subordinate processor core is the source of the system management interrupt, the flag to be set by the subordinate processor core.

The invention claimed is:

1. A multi-core processor to handle a system management interrupt generated in a computing device, the multi-core processor comprising:
   a system management interrupt service pending flag, wherein the multi-core processor is to set the system management interrupt service pending flag in response to detection of the system management interrupt;
   a processor core to (i) enter a system management mode in response to the detection of the system management interrupt by the multi-core processor and (ii) execute a system management interrupt handler manager in response to entrance of the system management mode, the system management interrupt handler manager to:
      determine whether an in-progress flag is set, the in-progress flag to indicate another processor core of the multi-core processor has acquired a master thread lock of the computing device;
      attempt to acquire the master thread lock in response to a determination that the in-progress flag is not set;
      set the in-progress flag in response to acquisition of the master thread lock;
      execute a master system management interrupt handler in response to the acquisition of the master thread lock;
      determine whether the system management interrupt service pending flag is set in response to the determination that the in-progress flag is not set;
      resume an execution mode of the processor core in response to a determination that the system management interrupt service pending flag is not set,
      attempt to acquire the master thread lock in response to a determination that the system management interrupt service pending flag is set, and
      clear the system management interrupt service pending flag in response to the acquisition of the master thread lock and prior to execution of the master system management interrupt handler.

2. The multi-core processor of claim 1, further comprising a subordinate processor core, wherein the system management interrupt handler manager is further to execute the master system management interrupt handler without a wait for the subordinate processor core to enter the system management mode.

3. The multi-core processor of claim 1, further comprising a system management interrupt status register, wherein the system management interrupt service pending flag comprises a system management interrupt service pending bit of the system management interrupt status register.

4. The multi-core processor of claim 1, wherein the processor core comprises a subordinate processor core, the multi-core processor further comprises a master processor core different from the subordinate processor core, and the system management interrupt handler manager is further to:
   execute a subordinate system management interrupt handler in response to a determination that the in-progress flag is set; and
   execute the subordinate system management interrupt handler in response to failure to acquire the master thread lock;
   wherein the subordinate system management interrupt handler is to:
      determine whether the subordinate processor core is a source of the system management interrupt;
      receive a command from the master processor core to handle the system management interrupt in response to a determination that the subordinate processor core is the source of the system management interrupt; and
      handle the system management interrupt in response to receipt of the command from the master processor core.

5. The multi-core processor of claim 4, wherein the subordinate system management interrupt handler is further to handle a machine check exception generated by a machine check architecture of the computing device.

6. The multi-core processor of claim 1, wherein the processor core comprises a master processor core, and the master system management interrupt handler is further to:
   determine whether the system management interrupt was generated by a component of the computing device other than a processor core;
   determine whether the system management interrupt was generated by the master processor core; and
   handle the system management interrupt in response to a determination that the system management interrupt was generated by the component of the computing device other than a processor core or a determination that the system management interrupt was generated by the master processor core, wherein to handle the system management interrupt comprises to handle a machine check exception generated by a machine check architecture of the computing device.

7. The multi-core processor of claim 1, further comprising a subordinate processor core different from the processor core, wherein the processor core comprises a master processor core and the master system management interrupt handler is further to:
   determine whether the subordinate processor core is a source of the system management interrupt;
   send a command to the subordinate processor core to handle the system management interrupt in response to a determination that the subordinate processor core is the source of the system management interrupt; and
   wait for the subordinate processor core to complete the handle of the system management interrupt.

8. A method for handling a system management interrupt generated in a computing device, the method comprising:
   entering, by a processor core of the computing device, a system management mode of the processor core in response to detecting the system management interrupt;
   determining, by the processor core, whether an in-progress flag is set, the in-progress flag to indicate another processor core of the computing device has acquired a master thread lock of the computing device;
   attempting, by the processor core, to acquire the master thread lock in response to determining the in-progress flag is not set;
   setting, by the processor core, the in-progress flag in response to acquiring the master thread lock; and executing, by the processor core, a master system management interrupt handler in response to acquiring the master thread lock;
determining, by the processor core, whether a system management interrupt service pending flag of the computing device is set in response to determining the in-progress flag is not set, wherein the system management interrupt service pending flag is to be set by a processor of the computing device in response to detecting the system management interrupt;
resuming, by the processor core, an execution mode of the processor core in response to determining the system management interrupt service pending flag is not set; and
clearing, by the processor core, the system management interrupt service pending flag in response to acquiring the master thread lock and prior to executing the master system management interrupt handler;
wherein attempting to acquire the master thread lock further comprises attempting to acquire the master thread lock in response to determining the system management interrupt service pending flag is set.

9. The method of claim 8, wherein the processor core comprises a subordinate processor core, the method further comprising:
executing, by the subordinate processor core, a subordinate system management interrupt handler in response to determining the in-progress flag is set; and
executing, by the subordinate processor core, the subordinate system management interrupt handler in response to not acquiring the master thread lock;
wherein executing the subordinate system management interrupt handler comprises:
determining, by the subordinate processor core, whether the subordinate processor core is a source of the system management interrupt;
receiving, by the subordinate processor core, a command from a master processor core of the computing device, different from the subordinate processor core, to handle the system management interrupt in response to determining the subordinate processor core is the source of the system management interrupt; and
handling, by the subordinate processor core, the system management interrupt in response to receiving the command from the master processor core.

10. The method of claim 8, wherein the processor core comprises a master processor core and wherein executing the master system management interrupt handler comprises:
determining, by the master processor core, whether a subordinate processor core of the computing device, different from the master processor core, is a source of the system management interrupt;
sending, by the master processor core, a command to the subordinate processor core to handle the system management interrupt in response to determining the subordinate processor core is the source of the system management interrupt; and
waiting, by the master processor core, for the subordinate processor core to complete handling the system management interrupt.

11. One or more non-transitory, machine readable storage media comprising a plurality of instructions that in response to being executed cause a computing device to:
enter, by a processor core of the computing device, a system management mode of the processor core in response to detecting the system management interrupt;
determine, by the processor core, whether an in-progress flag is set, the in-progress flag to indicate another processor core of the computing device has acquired a master thread lock of the computing device;
attempt, by the processor core, to acquire the master thread lock in response to determining the in-progress flag is not set;
set, by the processor core, the in-progress flag in response to acquiring the master thread lock;
execute, by the processor core, a master system management interrupt handler in response to acquiring the master thread lock;
determine, by the processor core, whether a system management interrupt service pending flag of the computing device is set in response to determining the in-progress flag is not set, wherein the system management interrupt service pending flag is to be set by a processor of the computing device in response to detecting the system management interrupt;
resume, by the processor core, an execution mode of the processor core in response to determining the system management interrupt service pending flag is not set; and
clear, by the processor core, the system management interrupt service pending flag in response to acquiring the master thread lock and prior to executing the master system management interrupt handler;
wherein to attempt to acquire the master thread lock further comprises to attempt to acquire the master thread lock in response to determining the system management interrupt service pending flag is set.

12. The non-transitory, machine readable media of claim 11, wherein to execute the master system management interrupt handler comprises to execute the master system management interrupt handler without waiting for a subordinate processor core of the computing device to enter the system management mode.

13. The non-transitory, machine readable media of claim 11, wherein to determine whether the system management interrupt service pending flag is set comprises to determine whether a service pending bit of a system management interrupt status register of the processor is set.

14. The non-transitory, machine readable media of claim 11, wherein the processor core comprises a subordinate processor core, the machine readable media further comprising a plurality of instructions that in response to being executed cause the computing device to:
execute, by the subordinate processor core, a subordinate system management interrupt handler in response to determining the in-progress flag is set; and
execute, by the subordinate processor core, the subordinate system management interrupt handler in response to not acquiring the master thread lock;
wherein to execute the subordinate system management interrupt handler comprises to:
determine, by the subordinate processor core, whether the subordinate processor core is a source of the system management interrupt;
receive, by the subordinate processor core, a command from a master processor core of the computing device, different from the subordinate processor core, to handle the system management interrupt in response to determining the subordinate processor core is the source of the system management interrupt; and
handle, by the subordinate processor core, the system management interrupt in response to receiving the command from the master processor core.

15. The non-transitory, machine readable media of claim 14, wherein to handle the system management interrupt comprises to handle a machine check exception generated by a machine check architecture of the computing device.

16. The non-transitory, machine readable media of claim 11, wherein the processor core comprises a master processor core and wherein to execute the master system management interrupt handler comprises to:
- determine, by the master processor core, whether the system management interrupt was generated by a component of the computing device other than a processor core;
- determine, by the master processor core, whether the system management interrupt was generated by the master processor core; and
- handle, by the master processor core, the system management interrupt in response to determining the system management interrupt was generated by the component of the computing device other than a processor core or in response to determining the system management interrupt was generated by the master processor core, wherein to handle the system management interrupt comprises to handle a machine check exception generated by a machine check architecture of the computing device.

17. The non-transitory, machine readable media of claim 11, wherein the processor core comprises a master processor core and wherein to execute the master system management interrupt handler comprises to:
- determine, by the master processor core, whether a subordinate processor core of the computing device, different from the master processor core, is a source of the system management interrupt;
- send, by the master processor core, a command to the subordinate processor core to handle the system management interrupt in response to determining the subordinate processor core is the source of the system management interrupt; and
- wait, by the master processor core, for the subordinate processor core to complete handling the system management interrupt.

* * * * *